N. M. HAHN.
STEREOSCOPE CINEMATOGRAPH CAMERA AND FILM.
APPLICATION FILED MAY 9, 1917.
1,282,073.
Patented Oct. 22, 1918.
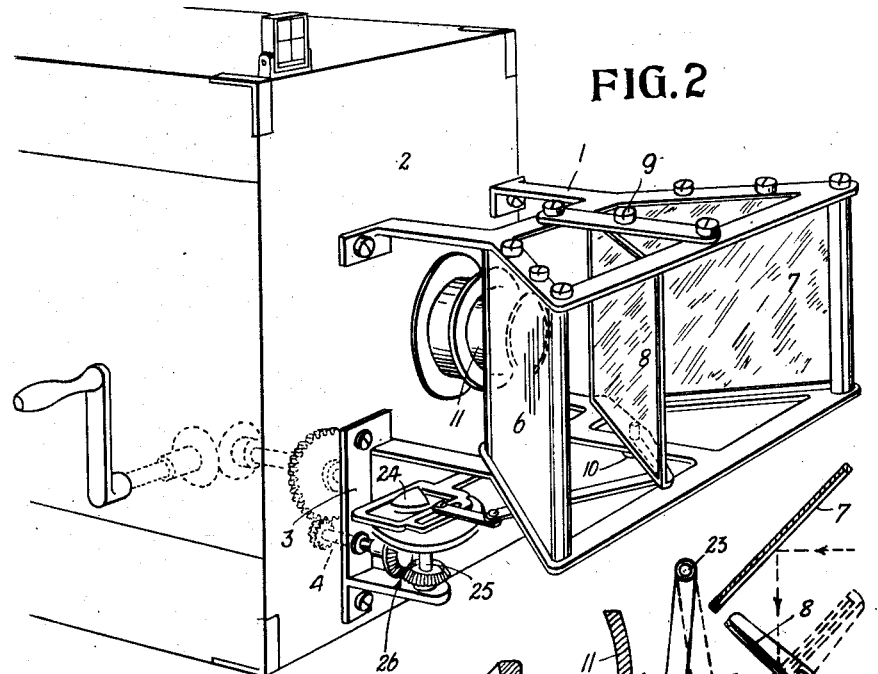
FIG. 2
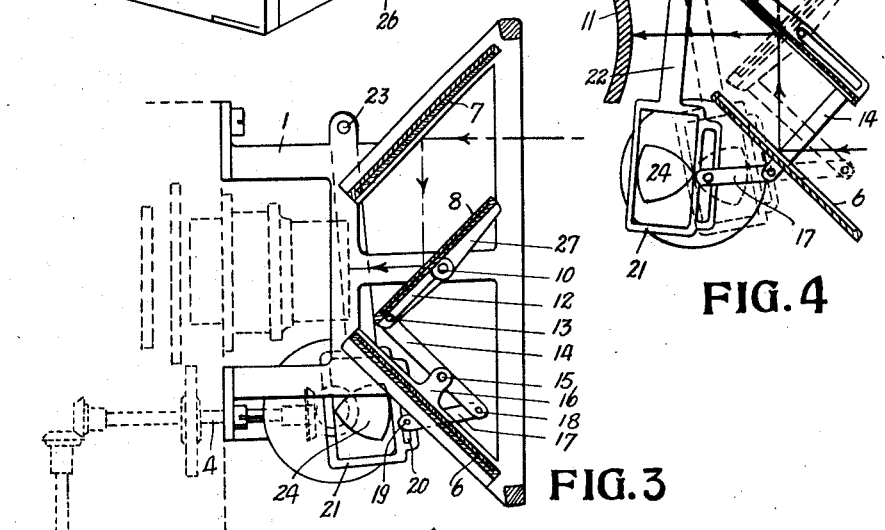
FIG. 4
FIG. 3
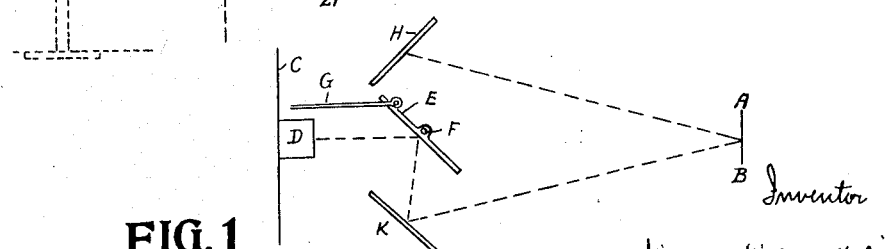
FIG. 1
Inventor
Norman Michael Hahn
by [signature]
his Attorney

UNITED STATES PATENT OFFICE.

NORMAN MICHAEL HAHN, OF NORTH SYDNEY, NEW SOUTH WALES, AUSTRALIA.

STEREOSCOPE CINEMATOGRAPH CAMERA AND FILM.

1,282,073.  Specification of Letters Patent.  Patented Oct. 22, 1918.

Application filed May 9, 1917. Serial No. 167,427.

*To all whom it may concern:*

Be it known that I, NORMAN MICHAEL HAHN, subject of the King of Great Britain and Ireland, residing at Lamont street, Crows Nest, North Sydney, New South Wales, Australia, have invented new and useful Improvements in Stereoscope Cinematograph Cameras and Films, of which the following is a specification.

The object of this invention is to procure stereoscopic pictures on cinematograph films, in a camera with one lens. This object is attained by producing alternate pictures on the film from the right hand and left hand respectively of the camera by the means hereinafter described, so that lights and shades from separate angles of view are obtained on successive pictures which are otherwise "progressively identical". When these pictures are projected on a screen in the usual way, a stereoscopic effect is obtained by reason of the persistence of vision of the observers, the rapidity of exposure being sufficient to allow the impression of a left hand picture to persist after the succeeding right hand picture has been exposed, and vice versa. The light and shade effects in the successive film pictures thus appear superposed in the apparently continuous picture projected therefrom on the screen, and a stereoscopic effect is obtained.

The camera in which alternate left and right hand pictures are produced on the film consists of a cinematograph camera of any standard type fitted with an attachment whereby the image of the object is received on the film through a system of reflectors and thence via the lens, and not directly from the object through the lens.

An oscillating plane reflector is mounted symmetrically in front of the lens on a vertical pivot, and this pivotally mounted reflector is connected mechanically with the shutter mechanism of the camera, so that at each successive opening of the shutter the reflector will be brought alternately into right hand and left hand angular position relative to the axis of the lens. Fixed plane mirrors at either side of the oscillating mirror alternately reflect a view of the object on to the oscillating mirror when said oscillating mirror is in either of its extreme angular positions, so that the images of the object are reflected from the fixed reflectors onto the oscillating reflector and are again reflected from the oscillating reflector toward the lens. The views of the object taken by the lens are therefore not views from one fixed point but are views obtained from either side of the lens alternately, and as at each opening of the shutter the oscillating reflector occupies its extreme right hand or left hand position as the case may be, alternating views from either side of the camera are procured and the pictures produced on the film are alternately endowed with light and shade as if viewed from either of two points, respectively right hand and left hand at some distance apart respectively.

The principle of this invention is explained in the accompanying diagrammatic drawing, Figure 1 in which the line A—B represents the object, C the camera, D the lens, E the oscillating reflector, F its vertical pivot, G the mechanical connection between the reflector E and the shutter mechanism, and H and K the laterally disposed fixed reflectors. The dotted lines indicate respectively the path of the light rays from the object as reflected by the mirrors into the lens. Fig. 2 is a perspective view of the front of the camera fitted with my reflector attachment and the mechanism for operating it; Fig. 3 is a horizontal sectional plan of the same, the camera parts being shown dotted; and Fig. 4 is a horizontal sectional plan of the mechanism with the oscillating reflector in reverse position.

It is impracticable to obtain satisfactory results unless oscillation is applied to the central mirror by mechanism which obviates vibration in that mirror during the time that the lens aperture is opened by the shutter.

Any failure of the mechanism to bring the oscillating reflector positively to rest and to hold it at rest during the period that the lens aperture is open, necessarily results in the blurring of the picture and it will be understood that if this blurring effect occurs even at considerable intervals the uniformity of a series of pictures on the film is destroyed and the value of the film is correspondingly depreciated.

The mechanism hereinafter described is effective for rapidly reversing the oscillating mirror by a movement which slows down the swing of the mirror as it approaches its extreme position and which also operates so as to apply swing to the mirror at a progressively increasing speed. The oscillating reflector is thus caused to reverse its position very rapidly, that is in less than one-twentieth of a second, but to begin and end this oscillating movement slowly and to be positively locked against vibration in its two extreme positions while the shutter is open.

It will be seen that the frame 1 is attached to the front of the camera 2 by screws and that the mechanism is mounted on a back plate 3 forming part of the frame 1, and that, operating motion is applied to the mechanism through a spindle 4 driven by gear wheels by the operating crank handle 5 by which the film feed device and the lens shutter are operated.

The right hand and left hand reflectors 6 and 7 are fixed in the frame 1, and the oscillating reflector 8 is carried in said frame on vertical pivots 9 and 10, so that said mirror may be oscillated about said pivots 9 and 10. 11 is the lens. The pivot axis 9—10 is in alinement with the lens axis, and the fixed reflectors 6 and 7 are set at either side of the lens and a little forward of it, usually at an angle of 45° but not necessarily at that angle. The mirror 8 is preferably a polished sheet of speculum or other suitable metal carried in a light frame, the lower part of which is formed with a flange 27 having a slot 12 cut in it at one side of the pivotal center 10 and parallel with the face of the mirror 8. In this slot works a pin 13, which should be fitted with a flat sided bush. Said pin 13 is fixed in the end of the lever 14. Said lever is pivotally fulcrumed at 15 in lugs 16 on the end part of the frame 1, and a link 17 articulated at 18 to the power end of the lever 14 serves to apply reciprocating motion to said lever. The free end of the link 17 is pivotally connected at 19 to a rider fixable in a slot 20 on the back of the box yoke 21 forming the end of a reciprocating arm 22, the rear end of which arm is pivotally mounted at 23 on a lower portion of the frame 1. Within the box yoke portion 21 of the arm 22 a triangular eccentric plate 24 with segmental sides is mounted on the top end of spindle 25, which is turned by gearing 26 connecting said spindle 25 with the shaft 4. The triangular eccentric plate 24 applies a variable oscillating movement to the arm 22, said movement commencing slowly, increasing in rate progressively to a maximum and thence decreasing in rate till the arm comes to rest. A variable vibratory movement with a pause between each vibration produced by a triangular eccentric plate working in a box yoke is already well known in the class of mechanical motions. This particular mechanical motion has been selected for the purpose of applying oscillatory movements to the reflector 8 because when neatly fitted it insures a positive period of rest at the end of each stroke. This positive rest period of the arm 22 at either end of its stroke is not however solely relied on to insure a steady position of the reflector 8 during the period while the lens shutter is opened. A further steadying of the oscillating reflector is obtained as a result of the course of the movement of the bushed pin 13 in the slot 12. In the fixed positions of the reflector 8 the lever 14 is approximately at right angles to the face of said reflector. Any movement of the lever 14 is then of minimum effect for applying movement to the reflector 8, whereas when the lever 14 is moved positively the bushed pin 13 slides inward toward the oscillating center 10 and when nearest the pivotal centers of the oscillating reflector, applies movement at a maximum rate to it. The slot and pin movement therefore insures a non-vibratory condition of the reflector 8, while the characteristic of the movement applied to the lever 14 by the triangular eccentric driver 24, 21, is also such that the movement of the lever 14 ceases as that lever reaches a perpendicular position in relation to the plane of the oscillating reflector 8, which reflector is at that moment in the correct angular position for reflecting the view of the object into the lens, as indicated by the arrows in Figs. 3 and 4.

For the purpose of making a neat adjustment in the angular position of the oscillating reflector 8, the rider carrying the pin 19 is set in the slot 20 so that a precisely correct extent of movement will be applied to the lever 14 by the triangular eccentric.

The operation of the various parts of the oscillating mechanism therefore mutually contributes to insure a non vibratory condition and a positive angular position of the oscillating reflector at the moment that said reflector is required to transmit the view of the object through the lens.

The ratio of the gearing is determined to effect the oscillation of the reflector 8 in proper timing with the lens shutter movements so that the lens shutter will be opened only at the times when the oscillating reflector is at rest at either of its extreme right hand and left hand positions.

What I claim as my invention and desire to secure by Letters Patent is:

1. In a device of the character described, the combination with a cinematograph camera, of angularly fixed reflectors at either side of the camera lens, a pivotally mounted reflector between said fixed reflectors, a lever fulcrumed between the camera and the pivoted reflector and having one end movably connected with said pivoted reflector, and means including a rotary cam for rocking said lever and oscillating said pivoted reflector.

2. In a device of the character described, the combination with a cinematograph camera, of angularly fixed reflectors at either side of the camera lens, a pivotally mounted reflector between said fixed reflectors, said pivoted reflector having a slotted flange, a lever fulcrumed between the camera and the pivoted reflector, a pin carried at one end of said lever and engaging the slot in said flange, and means including a rotary cam for rocking said lever and moving said pin back and forth in said slot to oscillate said pivoted reflector.

3. In a device of the character described, the combination with a cinematograph camera, of angularly fixed reflectors at either side of the camera lens, a pivotally mounted reflector between said fixed reflectors, a slotted flange carried by said pivoted reflector, a lever fulcrumed between the camera and the pivoted reflector, a pin at one end of said lever engaging said slot, a link having one of its ends pivotally connected to said lever, a movable arm in which the other end of said link is adjustable to adjust the throw of said link, and means for moving said arm to actuate said link and said lever to oscillate the pivoted reflector.

4. In a device of the character described, the combination with a cinematograph camera, of angularly fixed reflectors at either side of the camera lens, a pivotally mounted reflector between said fixed reflectors, a flange at the lower edge of said pivoted reflector, said flange having a slot therein at one side of the pivot of said pivoted reflector, a lever fulcrumed between the camera and said pivoted reflector, a pin at one end of said lever engaging the slot in said flange, a link having one of its ends pivotally connected to said lever, a pivoted arm having a box yoke and a slot near one end thereof, the opposite end of said link being adjustable in said last named slot, a cam operable in said yoke, and means for rotating said cam.

In testimony whereof, I have signed my name to this specification.

NORMAN MICHAEL HAHN.